United States Patent [19]

Song et al.

[11] 4,085,915
[45] Apr. 25, 1978

[54] COUPLING DEVICE FOR EQUIPPING A CAMERA ONTO THE TRIPOD

[76] Inventors: Kyong Jin Song; Yong Shik Song; Jong Shik Song; Jung Shik Song, all of 57-1, Kyongwon-dong 1-ka, Jonju, North Korea

[21] Appl. No.: 758,550

[22] Filed: Jan. 11, 1977

[51] Int. Cl.² .......................................... F16M 11/04
[52] U.S. Cl. ................................................. 248/187
[58] Field of Search ............... 248/187, 186, 185, 177, 248/176, 221.3, 222.1, 314, 131, 154, 500, 502

[56] References Cited

U.S. PATENT DOCUMENTS

| | | | |
|---|---|---|---|
| 1,386,664 | 8/1921 | Vaeth | 248/187 |
| 1,846,382 | 2/1932 | Bing | 248/187 |
| 1,877,845 | 9/1932 | Gerline | 248/222.1 |
| 1,944,476 | 1/1934 | Thalhammer | 248/187 |
| 2,834,567 | 5/1958 | Young | 248/187 |
| 3,029,053 | 4/1962 | Loehnis | 248/187 |
| 3,109,617 | 11/1963 | Meyer | 248/186 |
| 3,356,325 | 12/1967 | Schnase | 248/187 |
| 3,445,082 | 5/1969 | Proctor et al. | 248/187 |
| 3,738,606 | 6/1973 | Millen | 248/185 |

FOREIGN PATENT DOCUMENTS

| | | | |
|---|---|---|---|
| 695 of | 1907 | United Kingdom | 248/187 |
| 1,023,400 | 3/1966 | United Kingdom | 248/177 |

*Primary Examiner*—Marion Parsons, Jr.
*Attorney, Agent, or Firm*—Wenderoth, Lind & Ponack

[57] ABSTRACT

A coupling device for attaching a camera to a tripod which has a first coupling member attached on the underneath side thereof to the top of the tripod. A hollow upright member is positioned on the top, central portion of the first coupling member, and has a hole through at least one of its upright side walls. A hook member is pivotally mounted in the hollow member and extends through the hole in the side of the hollow member, while a push member within the first coupling plate adjacent the hook member pushes against the hook member and causes it to rotate. The push member is biased by a first spring on the opposite side of said hook member. Attached to the bottom of the camera is a second coupling member which has a screw portion at the top thereof threaded into the camera and an open cavity in the bottom thereof beneath the screw portion. The cavity is inserted over the hollow upright member, and the inside of the cavity has at least one locking groove engageable with the hook member. Also provided is at least one rubber packing member slidably extending upward from the first coupling member beneath the second coupling member and a second spring beneath the rubber packing for urging the packing upward.

3 Claims, 3 Drawing Figures

COUPLING DEVICE FOR EQUIPPING A CAMERA ONTO THE TRIPOD

BACKGROUND AND SUMMARY OF THE INVENTION

This invention relates to a coupling device for attaching a camera to a tripod. According to the present invention, it is possible to attach easily and conveniently a camera onto a tripod and, even if the direction of the camera is changed, the connection between the camera and the tripod is never loosened.

According to the prior arts, in order to fix a camera on a tripod, the camera may have a screw hole on which the bolt equipped on the tripod will be screwed. However, in such case, because the camera should be fixed on the tripod through the screw only, there is a defect in that the camera cannot be linked tightly when the screw hole or groove is loosened, so the direction of the camera lens may change because of the weight of the camera during the photographing. And, when a camera is fixed tightly to the tripod in order to prevent the relaxation or the deviation of the camera from the tripod during the photographing, it is not easy to separate the camera from the tripod when the photographing is finished.

According to the present invention, it is possible to attach a camera onto a tripod by using an intermediate connecting device characterized by this invention.

BRIEF DESCRIPTION OF THE DRAWINGS

The explanation of this invention is illustrated in detail in accordance with the accompanying drawings as follows.

DETAILED DESCRIPTION OF THE INVENTION

Figure 1:
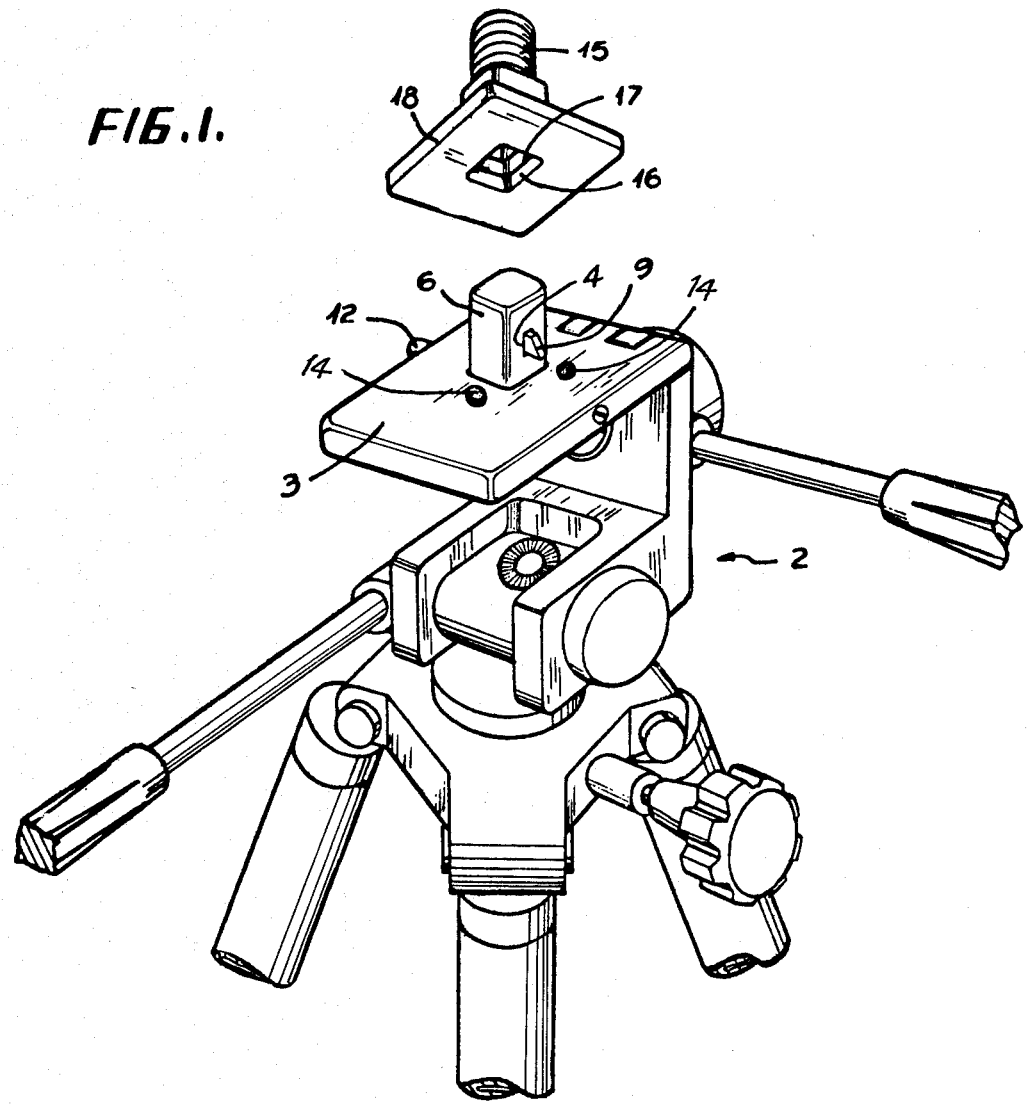
FIG. 1 is the perspective view of the coupling device of this invention.
Figure 2A:
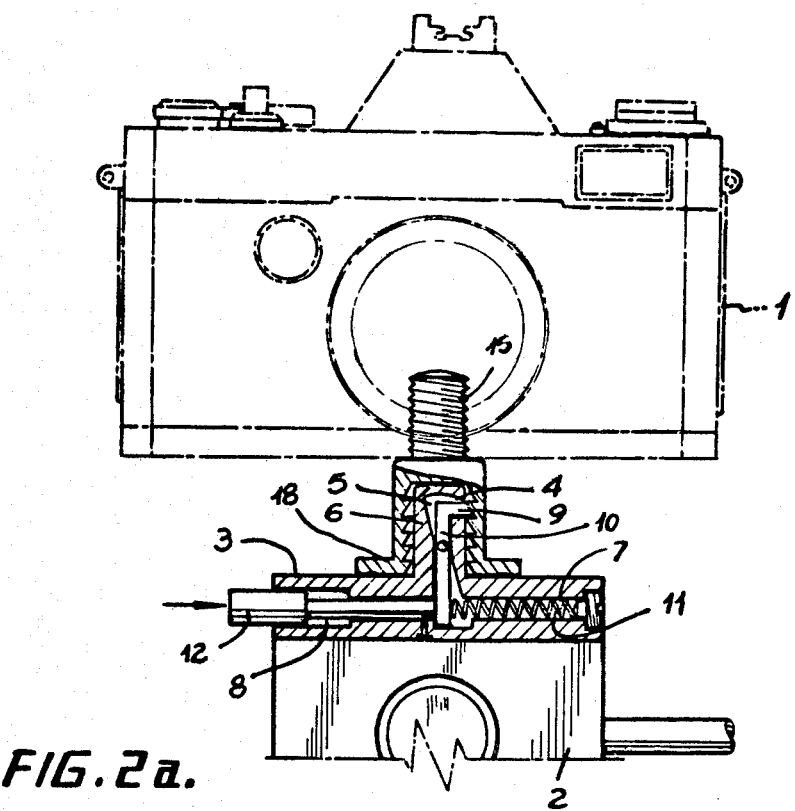
FIG. 2a is the sectional view of the coupling device of this invention, showing the camera on a tripod.
Figure 2B:
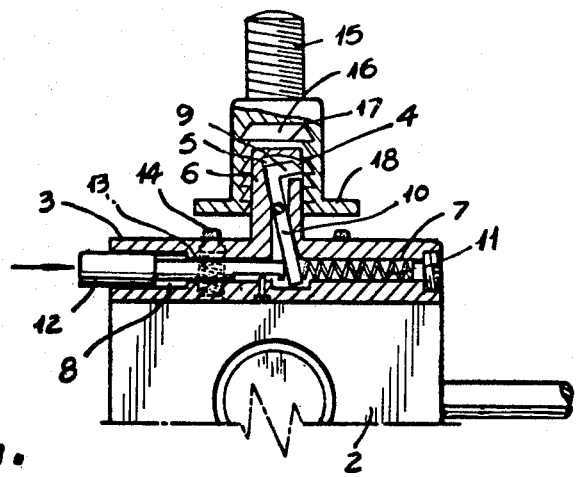
FIG. 2b is the sectional view of the coupling device of this invention, showing the camera removed from the tripod.

In order to position a camera 1 on an upper coupling plate 3 of a tripod 2, a square member 6 having an anchor groove 4 and the anchor operating room 5 is mounted on the central part of the coupling plate 3. On the inside of the upper coupling plate 3 comprising the square member 6, there is a spring chamber 7 and a button operating chamber 8. Inside the anchor groove 4 of the anchor operating room 5, there is an anchor 10 which has a hook 9. Because the anchor 10 is supported by a hinge and the spring chamber 7 has the spring 11, it is possible to maintain the suitable position of the hook 9 of the anchor 10. Because the button operating chamber 8 has the button 12 located against the spring 11, it is possible to push the button 12 inside along the space formed in the button operating chamber 8. On the upper coupling place 3 having the square member 6, there is a rubber packing member 14 supported by a spring 13.

A second coupling member 18 has a screw 15 which can be inserted into the screw hole (not shown on the drawings) of the camera on the upper outer part thereof and a square locking groove 16 on the inside thereof. Because the coupling member of this invention has the square locking groove 16 consisting of the multi-stage locking grooves 17, it is possible to tightly attach the camera to the tripod 3 through the coupling member 18.

According to the subject invention comprising the constructions as mentioned above, when the camera 1 is attached to the tripod 2, the screw 15 mounted on the upper outer part of the second coupling member 18 is inserted into the screw hole of the camera 1 and the square member 6 mounted on the upper coupling plate 3 of the tripod 2 is fixed into the square groove 16 on the inside of the coupling member 18. When the square member 6 is inserted into the the coupling member 18, the camera 1 can be tightly linked with the tripod 2 because the hook 9 forced against the locking groove 17 so that the camera 1 can be attached to the coupling plate 3 so that the camera may not be moved by the rubber packing member 14. Because the square member 6 mounted on the coupling plate 3 is fixed correctly into the square groove 16 of the coupling member 18, when the camera is attached to the tripod, the camera is always in its designated direction.

When the button 12 is pushed, the hook 9 of the anchor 10 releases from the locking groove 17 so that the camera 1 can be separated easily from the tripod 2 because the square member 6 is deviated from the square groove 16.

As mentioned above, according to the present invention, it is very easy to attach or remove a camera to and from a tripod. It is also possible, when taking pictures, to tilt coupling plate of the tripod in any direction.

We claim:

1. A coupling device for attaching a camera to a tripod, said device comprising:
   a first coupling member attached on the underneath side thereof to the top of said tripod;
   a hollow upright member on the top, central portion of said first coupling member, said hollow member having a hole through at least one upright side wall thereof;
   a hook member pivotally mounted in said hollow member and extending through said hole in the side thereof;
   push means within said first coupling plate adjacent said hook member for pushing against said hook member and causing said hook member to pivot;
   first spring means on the side of said hook member opposite said push means for biasing said hook member against said push means;
   a second coupling member attached to the bottom of said camera, said second coupling member having a screw portion at the top thereof threaded into said camera and an open cavity in the bottom thereof beneath said screw portion and inserted over said hollow upright member, and said second coupling further having inside said cavity at least one locking groove engageable with said hook member;
   at least one rubber packing member slidably extending upward from said first coupling member beneath said second coupling member; and
   second spring means beneath said rubber packing for urging said packing upward.

2. A device as claimed in claim 1, wherein both said upright hollow member and said cavity are square.

3. A device as claimed in claim 1, wherein there are a plurality of rubber packing members and second spring means.

* * * * *

UNITED STATES PATENT OFFICE
CERTIFICATE OF CORRECTION

Patent No. 4,085,915               Dated April 25, 1978

Inventor(s) Kyong Jin Song et al.

It is certified that error appears in the above-identified patent and that said Letters Patent are hereby corrected as shown below:

On the title page, item [76] Inventors, after "Jonju," "North Korea" should read --- Korea ---.

Signed and Sealed this

*Fifth* Day of *December 1978*

[SEAL]

*Attest:*

RUTH C. MASON
*Attesting Officer*

DONALD W. BANNER
*Commissioner of Patents and Trademarks*